United States Patent
Lehker et al.

(10) Patent No.: US 6,928,883 B2
(45) Date of Patent: Aug. 16, 2005

(54) MAGNETIC FIELD COUPLER FOR FLUID METER

(75) Inventors: Wayne H. Lehker, Milford, OH (US); Steven R. Snoke, Batavia, OH (US); Jon L. VanDonkelaar, Bellbrook, OH (US)

(73) Assignee: Mercury Instruments, Inc., Cincinnati, OH (US)

( * ) Notice: Subject to any disclaimer, the term of this patent is extended or adjusted under 35 U.S.C. 154(b) by 0 days.

(21) Appl. No.: 10/966,369

(22) Filed: Oct. 15, 2004

(65) Prior Publication Data

US 2005/0092100 A1 May 5, 2005

Related U.S. Application Data

(60) Provisional application No. 60/512,363, filed on Oct. 17, 2003.

(51) Int. Cl.$^7$ .................................................. G01F 1/58
(52) U.S. Cl. .................................. 73/861.13; 73/861.94
(58) Field of Search .................... 73/861.13, 861.08, 73/861.88, 861.93, 861.94; 324/174, 207.25, 207.2, 207.21; 335/335, 302–306; 336/214, 216, 233

(56) References Cited

U.S. PATENT DOCUMENTS 5,216,924 A  *  6/1993  Le Breton ............... 73/152.35
5,264,790 A  * 11/1993  Moretti et al. ............. 324/174

* cited by examiner

Primary Examiner—Harshad Patel
Assistant Examiner—Corey D. Mack
(74) Attorney, Agent, or Firm—Wood, Herron & Evans, L.L.P.

(57) ABSTRACT

A magnetic field coupler has a plurality of magnetic poles with respective first ends located immediately adjacent a circular path of a rotating magnet in a meter. The magnetic poles have respective opposite ends located immediately adjacent a magnetic sensor in a meter reading device. A nonmagnetic material separates each of the plurality of poles from all others of the plurality of the poles, and the nonmagnetic material is joined with the poles to form a unitary structure.

13 Claims, 5 Drawing Sheets

MAGNETIC FIELD COUPLER FOR FLUID METER

This application claims the benefit of U.S. Provisional Application No. 60/512,363 filed on Oct. 17, 2003.

FIELD OF THE INVENTION

The present invention relates in general to fluid meters and more specifically, to a fluid meter having a magnet that rotates in response to fluid flow.

BACKGROUND OF THE INVENTION

Fluid meters, for example, those used to measure a flow of natural gas petroleum products or water, often have a shaft with one or more blades or vanes that are rotated by a flow of fluid through the meter. A magnet is often mounted on the shaft and produces a rotating magnetic field that, by mechanical, electrical, or electronic means, conveys flow information to a totalizing or rate measuring apparatus. The rotating field is often used to cause rotation of a shaft-mounted secondary magnet that, in turn, drives a mechanical totalizer or a magnetically sensitive detector generating pulses in an electrical circuit.

Typically, in order to be close to the rotating magnet, the magnetically sensitive detector is located in a cup approximately one-half inch in diameter, which is set into a side of a meter housing. Inside the meter, the cup is surrounded by the rotating magnet; and hence, the magnetically sensitive detector is able to a rotating magnetic field from the magnet. While a magnetically sensitive detector installed this way provides accurate fluid flow measurements, it does have some disadvantages. First, the magnetically sensitive detector is often mounted on a printed circuit board assembly that contains electrical components necessary to interface with the detector. Further, the printed circuit board assembly must be sized to fit in the cup in the meter housing; and that requirement places significant design limitations on the detector circuitry, which often leads to an increase in cost.

A second disadvantage is that different size fluid meters often have different size cups into which the magnetically sensitive detector is to be located; and the requirement to design, manufacture and inventory different sizes of detectors to fit the various sizes of cups is also costly. A third disadvantage relates to the construction of many meter housings. The hole in which the magnetically sensitive detector is located is capped by a metal plate inside the housing that is sealed with a gasket to prevent fluid leaks. Over time, it is possible for the gasket to fail; and the fluid then leaks into the hole, thereby exposing the detector to corrosive effects, if any, of the fluid.

Therefore, there is a need to provide a capability of sensing the rotation of a magnet within the meter housing, which does not have the disadvantages discussed above.

SUMMARY OF THE INVENTION

The present invention is used with fluid meters having a magnet that rotates in response to fluid flow, and the present invention provides a magnetic field coupler that eliminates all constraints on the design and size of a magnetic sensor. The magnetic field coupler of the present invention also permits a common magnetic sensor design to be used with fluid meters of many different sizes. In addition, the magnetic field coupler of the present invention permits the magnetic sensor to be better isolated from leaking fluid. The magnetic field coupler of the present invention is especially useful with rotary meters used for measuring gas flows.

According to the principles of the present invention and in accordance with the described embodiments, the invention provides an apparatus for coupling a magnetic field from a magnet rotating in response to fluid flow in a fluid meter to a magnetic sensor in a meter reading device. The apparatus has a plurality of magnetic poles with respective first ends located immediately adjacent the circular path of the magnet, and respective opposite ends located immediately adjacent the magnetic sensor in the meter reading device. A nonmagnetic material separates each of the plurality of poles from all others of the plurality of the poles, and the nonmagnetic material is joined with the poles to form a unitary structure.

These and other objects and advantages of the present invention will become more readily apparent during the following detailed description taken in conjunction with the drawings herein.

DETAILED DESCRIPTION OF THE INVENTION

Figure 1:
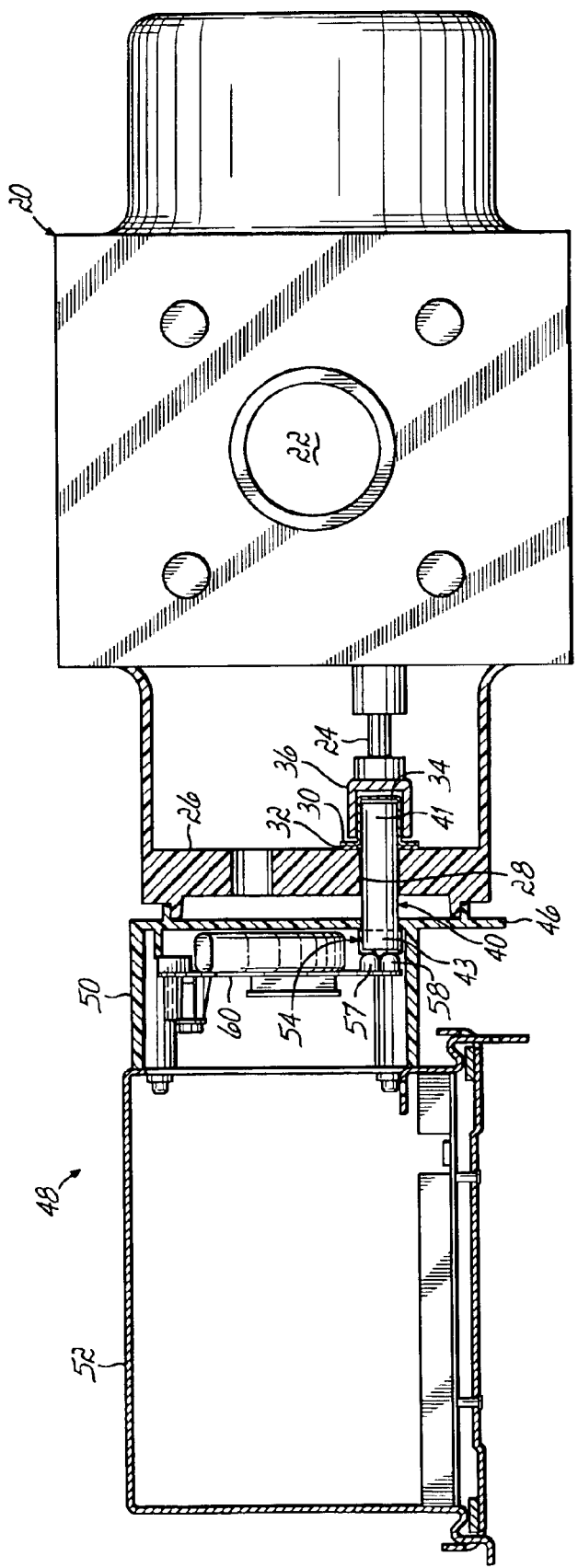
FIG. 1 is a cross-sectional view of a magnetic field coupler interposed between a rotating magnet in the fluid meter and an external magnetic sensor in a meter reading device in accordance with the principles of the present invention.
Figure 1A:
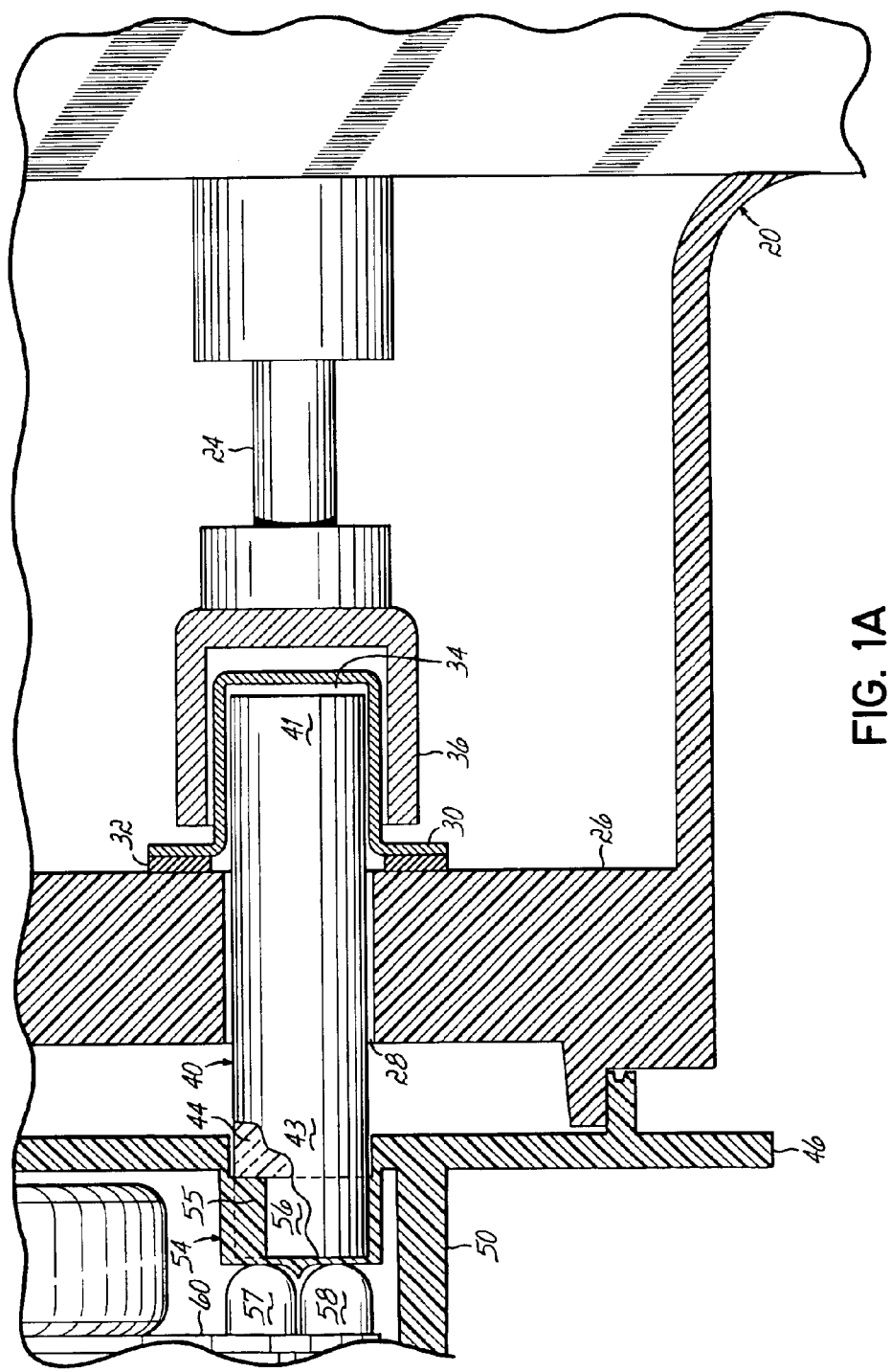
FIG. 1A is an exploded view of a portion of FIG. 1.

Referring to FIGS. 1 and 1A, a fluid rotary meter 20 has a fluid passage 22 for conducting a fluid therethrough. A rotary shaft 24 has blades or vanes (not shown) disposed in the fluid passage. Fluid flow through the passage 22 impacts the vanes and causes a rotation of the shaft 24 in a known manner. An wall 26 of the meter 20 has a hole 28 covered by a cup 30 that is sealed against the wall 26 by a gasket 32. The cup 30 forms a pulse well 34 extending into the meter 20. A ring-shaped magnet 36 connected to the end of the rotating shaft 24 surrounds the pulse well 34 of the cup 30.

As previously discussed, with known designs, magnetic sensors mounted on a PC board assembly are located inside the pulse well 34 to magnetically couple with the magnet 36. The present invention permits the magnetic sensor and PC board assembly to be removed from inside the meter 20 by utilizing a magnetic field coupler 40. The magnetic field coupler 40 is generally cylindrically shaped such that one end 41 fits within the pulse well 34 in a manner to provide a suitable magnetic coupling with the magnet 36. A mounting plate 46 facilitates attaching a meter reading device 48 to the meter 20. The mounting plate 46 forms one end of a housing 50 mounted to an instrument case 52 containing known electrical circuits of the meter reading device.

Figure 2:
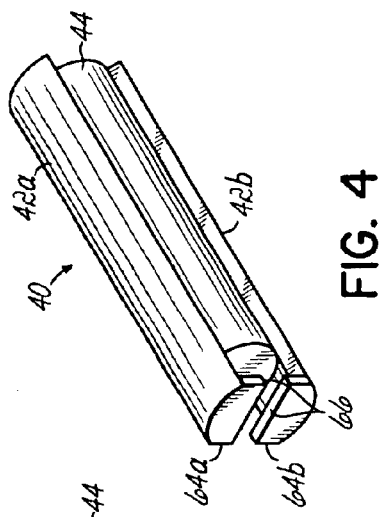
FIG. 2 is a perspective view of a two pole embodiment of the magnetic field coupler of FIG. 1.

As shown in FIG. 2, the magnetic field coupler 40 is comprised of a plurality of poles, for example, two poles, 42 separated by a nonmagnetic material 44. An opposite end 43 of the magnetic field coupler 40 extends into a socket 54 (FIG. 1A) of the mounting plate 46, and the socket 54 has a block or key 55 that has a width equal to a spacing between the opposite ends of the poles 42. Flat surfaces 56 (FIG. 2) on the poles 42 straddle the key 55, thereby preventing angular motion of the magnetic field coupler 40. Thus, the coupler end 41 is angularly fixed with respect to the rotating magnet 36, and the coupler end 43 is angularly fixed with respect to magnetic sensors 57, 58. The magnetic sensors 57, 58 are part of a PC board assembly 60 mounted in the housing 50. The PC board assembly 60 includes other electrical components for operating the magnetic sensors 57, 58 in a known manner.

Figure 3:
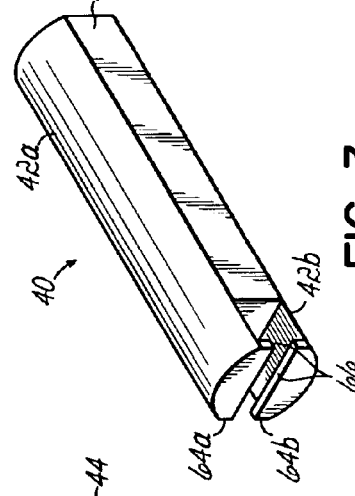
FIG. 3 is a perspective view of another two pole embodiment of the magnetic field coupler of FIG. 1.
Figure 4:
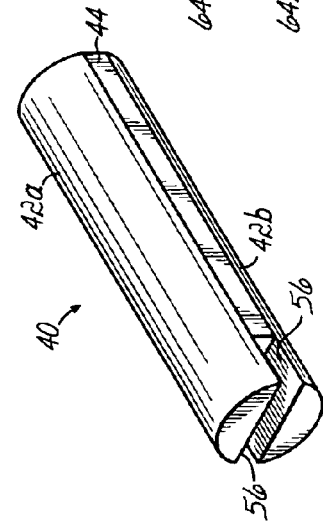
FIG. 4 is a perspective view of a further two pole embodiment of the magnetic field coupler of FIG. 1.

The construction of the magnetic field coupler 40 is dependent on the meter 20. For example, the pulse wells of different sizes of meters will have different diameters and depths. Further, the number of poles on the magnet 36 may vary. Referring to FIG. 2, in one embodiment, the magnetic field coupler 40 is comprised of two poles 42a, 42b with the nonmagnetic material 44 interposed therebetween. The spacing between the poles 42 may be varied to optimize the transmission of magnetic fields through the magnetic field coupler 40. Therefore, as shown in FIG. 3, the nonmagnetic material 44 may be thicker, thereby separating the poles 42a, 42b more. If the poles 42 have a separation greater than the width of the key 55, the ends of the poles are formed with lips 64a, 64b having flat surfaces 66 that straddle the key 55 to hold the magnetic field coupler fixed. Alternatively, as shown in FIG. 4, the nonmagnetic material 44 may have a greater thickness, thereby further separating the poles 42.

Figure 5:
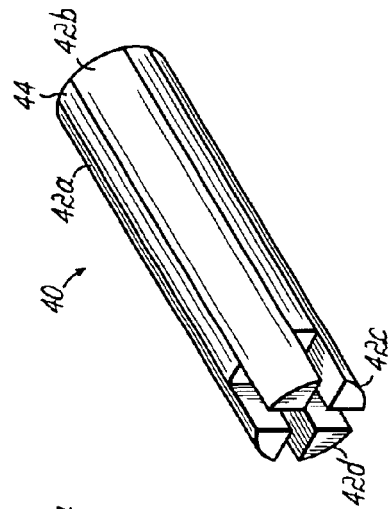
FIG. 5 is a perspective view of a three pole embodiment of the magnetic field coupler of FIG. 1.
Figure 6:
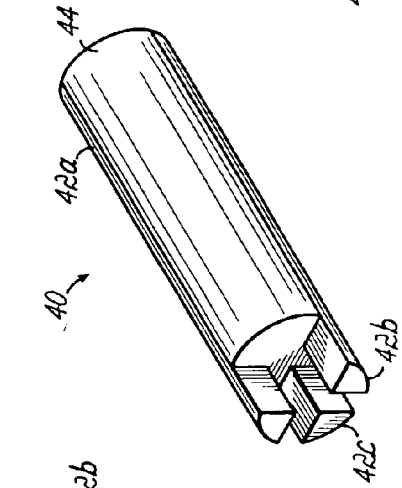
FIG. 6 is a perspective view of another three pole embodiment of the magnetic field coupler of FIG. 1.
Figure 7:
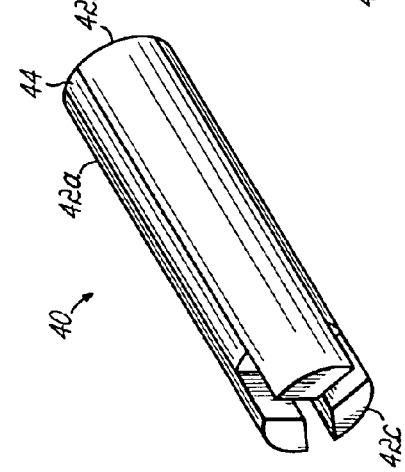
FIG. 7 is a perspective view of a four pole embodiment of a the magnetic field coupler of FIG. 1.

Different numbers of poles on the magnet 36 will dictate further embodiments of the magnetic field coupler 40. For example, as shown in FIG. 5, if the magnet 36 has three poles, the magnetic field coupler 40 can also have three poles 42a, 42b, 42c that are uniformly separated by a nonmagnetic material 44. As shown in FIG. 6, in an alternative embodiment of a three pole magnetic field coupler, the nonmagnetic material 44 creates a nonuniform spacing between the poles 42a, 42b, 42c. In a further embodiment shown in FIG. 7, the magnetic field coupler 40 may have four poles 42a, 42b, 42c, 42d separated by an nonmagnetic material 44. Therefore, there is no limit on the number of poles 42 that may be utilized within the magnetic field coupler 40; and with known meters, the magnetic field coupler 40 can be made with six or more poles.

The poles 42 are made from a material that provides excellent conduction of a magnetic field, for example, a soft iron such as low carbon steel, 1008-1010. The nonmagnetic material 44 may be any nonmagnetic material, for example, a commercially available ultra-high molecular weight material. The poles 42 are attached to the nonmagnetic material 44 by an adhesive or any other means that secures the poles and nonmagnetic material into a unitary structure while minimizing interference with the transmission of the magnetic field along the coupler 40. The distance from the bottom of the pulse well 34 to the bottom of the socket 46 determines the length of the magnetic field coupler 40, and the diameter of the pulse well 34 determines the diameter of the magnetic field coupler 40.

Figure 9:
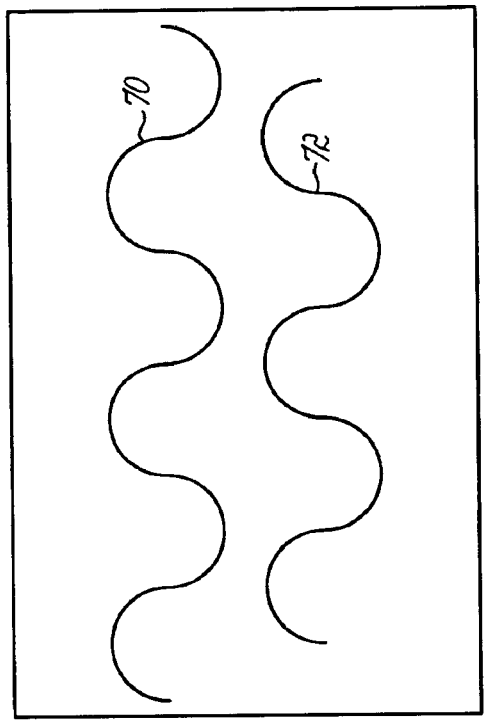
FIG. 9 is a schematic representation of waveforms that are produced by magnetic sensors detecting magnetic fields from the magnetic field couplers of FIGS. 9 and 10.
Figure 8:
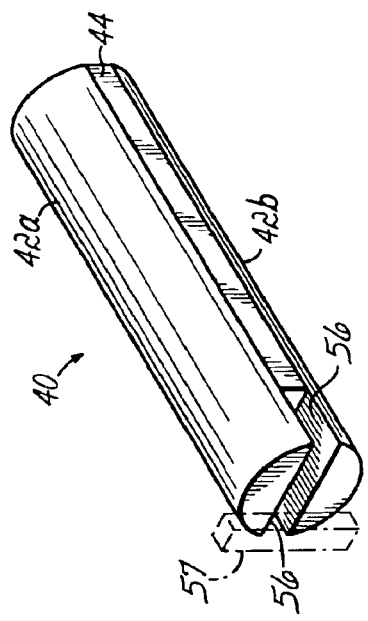
FIG. 8 is a perspective view of an arrangement of a magnetic sensor and a two pole magnetic field coupler, which can be used to detect fluid flow through the meter in a forward direction.

In use, fluid flow through the meter 20 (FIG. 1) in one direction causes rotation of the shaft 24 and magnet 36 in one direction. The rotation of the magnet 36 induces magnetic fields into the coupler end 41. The magnetic fields are detected by the magnetic sensors 57, 58 at the opposite end 43 of the magnetic field coupler 40. Referring to FIG. 8, if a two pole magnetic field coupler 40 is used, the magnetic sensor 57 produces an output signal schematically represented by sinusoidal output waveform 70 as shown in FIG. 9. The waveform 70 is processed by electrical circuits in the instrument case 52 (FIG. 1) in a known manner to obtain a signal representing fluid flow through the meter 20 in the one direction, for example, a forward direction. In order to improve the reliability of the system, a second magnetic sensor 58 is often used and mounted in a position parallel with the magnetic sensor 57. With this embodiment, the second sensor 58 produces an output waveform identical and in phase with the waveform 70.

Figure 10:
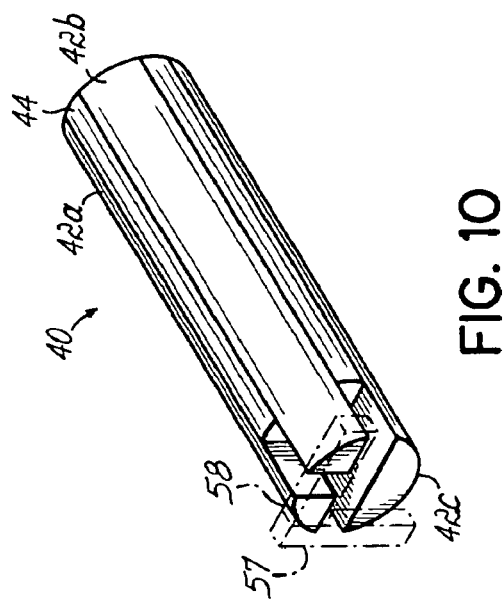
FIG. 10 is a perspective view of an arrangement of magnetic sensors and a three pole magnetic field coupler, which can be used to detect fluid flow through the meter in forward and reverse directions.

In many applications, it is beneficial to be able to detect and measure bidirectional fluid flows through the meter 20, that is, a fluid flow in a forward direction and a fluid flow in an opposite, reverse direction. A sensor arrangement for detecting reverse fluid flow is shown in FIG. 10. In this embodiment, the sensor 57 is mounted perpendicular to, that is, at a right angle with, the sensor 58; and the magnetic field coupler 40 has three poles 42a, 42b, 42c. It should be noted that the poles do not have to be of an identical size and shape. Pole 42c is larger than the poles 42a and 42b. In this embodiment, magnetic sensor 57 provides an output signal schematically represented by sinusoidal waveform 70 of FIG. 9; and magnetic sensor 58 provides an output signal schematically represented by sinusoidal waveform 72. With the sensors 57, 58 mounted perpendicular to each other, the output waveforms are ninety degrees out of phase. With fluid flowing through the meter 20 in one direction, for example, a forward direction, waveform 70 leads waveform 72 by ninety degrees as shown in FIG. 9. However, if fluid is flowing through the meter 20 in an opposite direction, that is, the fluid is experience reverse flow, the waveform 72 will lead the waveform 70 by ninety degrees. The quadrature relationship between the waveforms 70, 72 is detectable by circuitry in the instrument case 52 in a known manner, so that the reverse flow of the fluid can be measured. If desired, another two magnetic sensors can be mounted opposite the sensors 57, 58 of FIG. 10 to provide redundancy in the event of a failure of one of the sensors.

Figure 12:
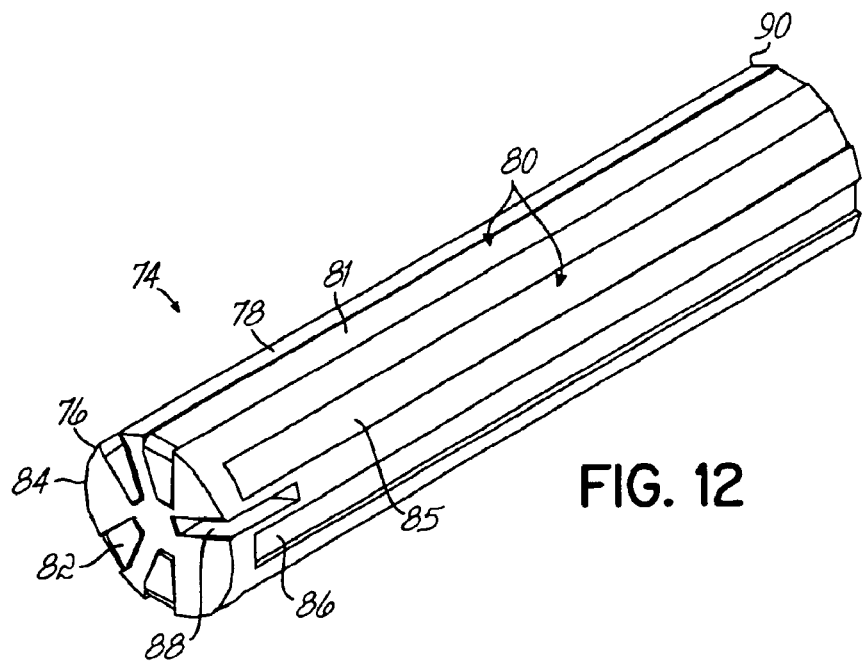
FIG. 12 is a perspective view of another embodiment of a magnetic field coupler in accordance with the principles of the present invention.

Referring to FIG. 12, a magnetic field coupler 74 is comprised of a cylindrical body 76 having a plurality of slots 78 equally spaced about the circumference of the body 76. As will be appreciated, the body 76 can be noncircular such as a polygon that has a number of sides equal to the number of poles thereon. Conductive poles 80 are secured in the slots 78 by adhesive or other means. Active poles 81 have ends 82 that fold or bend over a sensor end 84 of the magnetic field coupler 74. The ends 82 are sized and spaced to magnetically couple to the magnetic sensors 57, 58 shown in FIG. 1A. Passive poles 85 have ends 86 that stop short of the sensor end 84. The passive poles 85 are used to achieve a magnetic symmetry circumferentially about the magnetic field coupler 74. A key slot 88 is used to properly angularly position the magnetic field coupler 74 within the socket 54 of FIG. 1A. The pick up end 90 of the magnetic field coupler 74 is disposed within the cup 30 of FIG. 1A within the meter 20. The active pole ends 82 are not equally spaced about the circumference, so that a direction of rotation of the shaft can be detected. However, the combination of the active poles 81 and the passive poles 85 are substantially equally spaced about the circumference to achieve the desired magnetic symmetry. The body 76 is made from a magnetically nonconductive material, for example, a plastic such as a polycarbonate, wood, etc. The poles 80 are made from a transformer laminate material or other low hysteresis steel.

Figure 13:
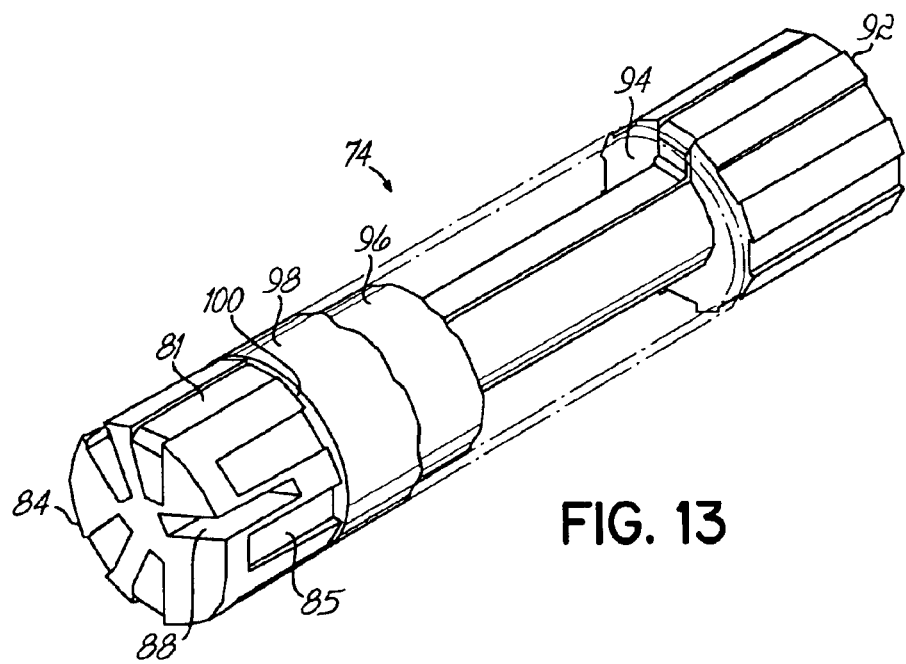
FIG. 13 is a perspective view of a further embodiment of the magnetic field coupler of FIG. 12.

An alternative embodiment of the magnetic field coupler 74 is illustrated in FIG. 13. In this embodiment, a cylindrical body 92 has a central smaller diameter necked portion 94. There is the same arrangement of active and passive poles 81, 85, respectively, as shown in FIG. 12. However, the poles 81, 85 descend downward into the center necked portion 94 of the body 92 and extend from the pick up end 92 to the sensor end 84. The poles 81, 85 are covered by a first layer of a magnetically nonconductive material, for example, a plastic such as a polycarbonate. An outer layer 98 of a magnetically conductive material such as a transformer laminate covers the nonconductive layer 96. The outer layer 98 has an insulating air gap 100 between its ends and the poles 81, 85.

By permitting the magnetic sensors 57, 58 to be removed from the pulse well 34, the magnetic field coupler 40 provides many advantages. First, the design constraints on the PC board assembly 60 that supports the magnetic sensors 57, 58 are substantially reduced; and the cost of the PC board assembly 60 can be reduced. In addition, variations in the size of the meter 20, the pulse well 34 and the number of poles on the magnet 36 are accommodated by the use of different magnetic field couplers 40 which are relatively simple and inexpensive components to manufacture. This permits a common PC board assembly 60 to be used with a wide range of different meters 20. The magnetic field sensor 40 further permits the PC board assembly 60 and the magnetic sensors 57, 58 to be mounted in a sealed chamber within the housing 50 of the meter reading device 48. Therefore, the PC board assembly 60 is protected from any corrosive effects of the fluid in the event of a failure of the gasket 32. In addition, the sensors can be readily arranged to detect reverse flow of the fluid through the meter.

Figures 11A, 11B, 11C:
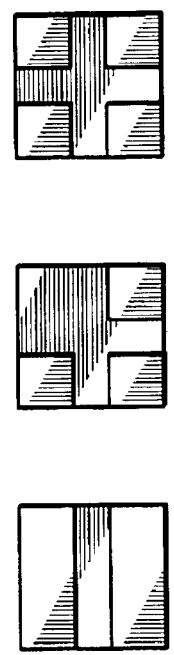
FIGS. 11A, 11B and 11C are end views of the magnetic field couplers illustrating alternative cross-sectional profiles for ends of the magnetic field couplers interfacing with the meter reading device.

While the present invention has been illustrated by a description of an embodiment, and while such embodiment has been described in considerable detail, there is no intention to restrict, or in any way limit, the scope of the appended claims to such detail. Additional advantages and modifications will readily appear to those skilled in the art. For example, in the described embodiment, the poles 42 are separated by a distance permitting the poles 42 to span the key 54, thereby holding the magnetic field coupler 40 fixed with respect to the rotating magnet 36 and the magnetic sensors 57, 58. As will be appreciated, in an alternative embodiment, the key 54 can be eliminated and the cross-sectional profile of the socket 46 made noncircular, for example, square, hexagonal, etc. Similarly, the opposite end 43 of the magnetic field coupler 40 is made to have a noncircular cross-sectional profile, for example, a square cross-sectional profile as shown in FIGS. 11A–11C, so that the magnetic field coupler 40 is fixed with respect to the rotating magnet 36 and magnetic sensors 57, 58. While such an embodiment provides opposed flat surfaces on the magnetic field coupler 40 and the socket for fixing the magnetic field coupler in place, in an alternative embodiment, such flat surfaces can be arcuate or curved and also function to restrain the magnetic field coupler from motion.

Therefore, the invention in its broadest aspects is not limited to the specific details shown and described. Consequently, departures may be made from the details described herein without departing from the spirit and scope of the claims which follow.

What is claimed is:

1. An apparatus for coupling a magnetic field from a magnet in a fluid meter to a magnetic sensor in a meter reading device, the magnet rotating in response to fluid flow through the meter, the apparatus comprising:
   a plurality of magnetic poles comprising
      respective first ends adapted to be located immediately adjacent the circular path of the magnet, and
      respective opposite ends adapted to be located immediately adjacent the magnetic sensor in the meter reading device; and
   a nonmagnetic material separating each of the plurality of poles from all others of the plurality of the poles, the nonmagnetic material being joined with the poles to form a unitary structure.

2. The apparatus of claim 1 wherein the meter reading device has a surface and the unitary structure comprises a surface adapted to be opposite the surface of the meter reading device for securing the unitary structure from motion with respect to the magnet and the magnetic sensor.

3. The apparatus of claim 1 wherein the meter reading device has a surface and one of the first ends comprises a surface adapted to be opposite the surface of the meter reading device for securing the unitary structure from motion with respect to the magnet and the magnetic sensor.

4. The apparatus of claim 1 wherein the plurality of poles comprises two magnetic poles.

5. The apparatus of claim 1 wherein the plurality of magnetic poles comprises three magnetic poles.

6. The apparatus of claim 1 wherein the plurality of magnetic poles comprises four magnetic poles.

7. The apparatus of claim 1 wherein the plurality of magnetic poles comprises six magnetic poles.

8. The apparatus of claim 1 wherein the nonmagnetic material provides a uniform spacing between the magnetic poles.

9. The apparatus of claim 1 wherein the nonmagnetic material provides a nonuniform spacing between the magnetic poles.

10. An apparatus for coupling a magnetic field from a magnet in a fluid meter to a magnetic sensor in a meter reading device, the magnet rotating in response to fluid flow through the meter, the apparatus comprising:
    a body comprising a nonmagnetic material, the body supporting
       a plurality of active magnetic poles spaced about the body and comprising
          respective first ends adapted to be located immediately adjacent the circular path of the magnet, and
          respective opposite ends adapted to be located immediately adjacent the magnetic sensor in the meter reading device, and
       a plurality of passive magnetic poles spaced about the body, the plurality of passive poles comprising respective first ends adapted to be located immediately adjacent the circular path of the magnet.

11. A method of coupling a magnetic field from a magnet in a fluid meter to a magnetic sensor in a meter reading device, the magnet rotating in a circular path in response to fluid flow through the meter, the fluid meter further having a housing with a hole having a bottom immediately adjacent a circular path of the magnet, the method comprising:

coupling a magnetic field from the magnet with one end of magnetic field coupler comprising
a plurality of magnetic poles comprising
respective first ends adapted to be located immediately adjacent the circular path of the magnet, and
respective opposite ends adapted to be located immediately adjacent the magnetic sensor in the meter reading device, and
a nonmagnetic material separating each of the plurality of poles from all others of the plurality of the poles, the nonmagnetic material being joined with the poles to form a unitary structure; and coupling a magnetic field from an opposite end of the magnetic field coupler to the magnetic sensor in the meter reading device.

12. An apparatus for detecting a bidirectional fluid flows in a fluid meter having a magnet rotating in response to fluid flow through the meter, the apparatus comprising:

a plurality of magnetic poles comprising
respective first ends adapted to be located immediately adjacent
the circular path of the magnet, and respective opposite ends;

a nonmagnetic material separating each of the plurality of poles from all others of the plurality of the poles, the nonmagnetic material being joined with the poles to form a unitary structure;

a first magnetic sensor adjacent the opposite ends of the plurality of magnetic poles, the first magnetic sensor providing a first output signal in response to a rotation of the magnet; and a second magnetic sensor adjacent the opposite ends of the plurality of magnetic poles, the second magnetic sensor being mounted perpendicular to the first magnetic sensor and providing a second output signal in response to a rotation of the magnet, the second output signal being out of phase with the first output signal.

13. An apparatus for detecting a bidirectional fluid flows in a fluid meter having a magnet rotating in response to fluid flow through the meter, the apparatus comprising:

a body comprising a nonmagnetic material, the body supporting
a plurality of active magnetic poles not equally spaced about the body and comprising respective first ends adapted to be located immediately adjacent the circular path of the magnet, and respective opposite ends, and
a plurality of passive magnetic poles spaced about the body such that the plurality of active poles and the plurality of passive poles are substantially equally spaced about the body, the plurality of passive poles comprising respective first ends adapted to be located immediately adjacent the circular path of the magnet;

a first magnetic sensor adjacent respective opposite ends of the plurality of active magnetic poles and the plurality of passive magnetic poles, the first magnetic sensor providing a first output signal in response to a rotation of the magnet; and a second magnetic sensor adjacent the respective opposite ends of the plurality of active magnetic poles and the plurality of passive magnetic poles, the second magnetic sensor being mounted perpendicular to the first magnetic sensor and providing a second output signal in response to a rotation of the magnet, the second output signal being out of phase with the first output signal.

* * * * *